United States Patent Office 3,419,281
Patented Dec. 31, 1968

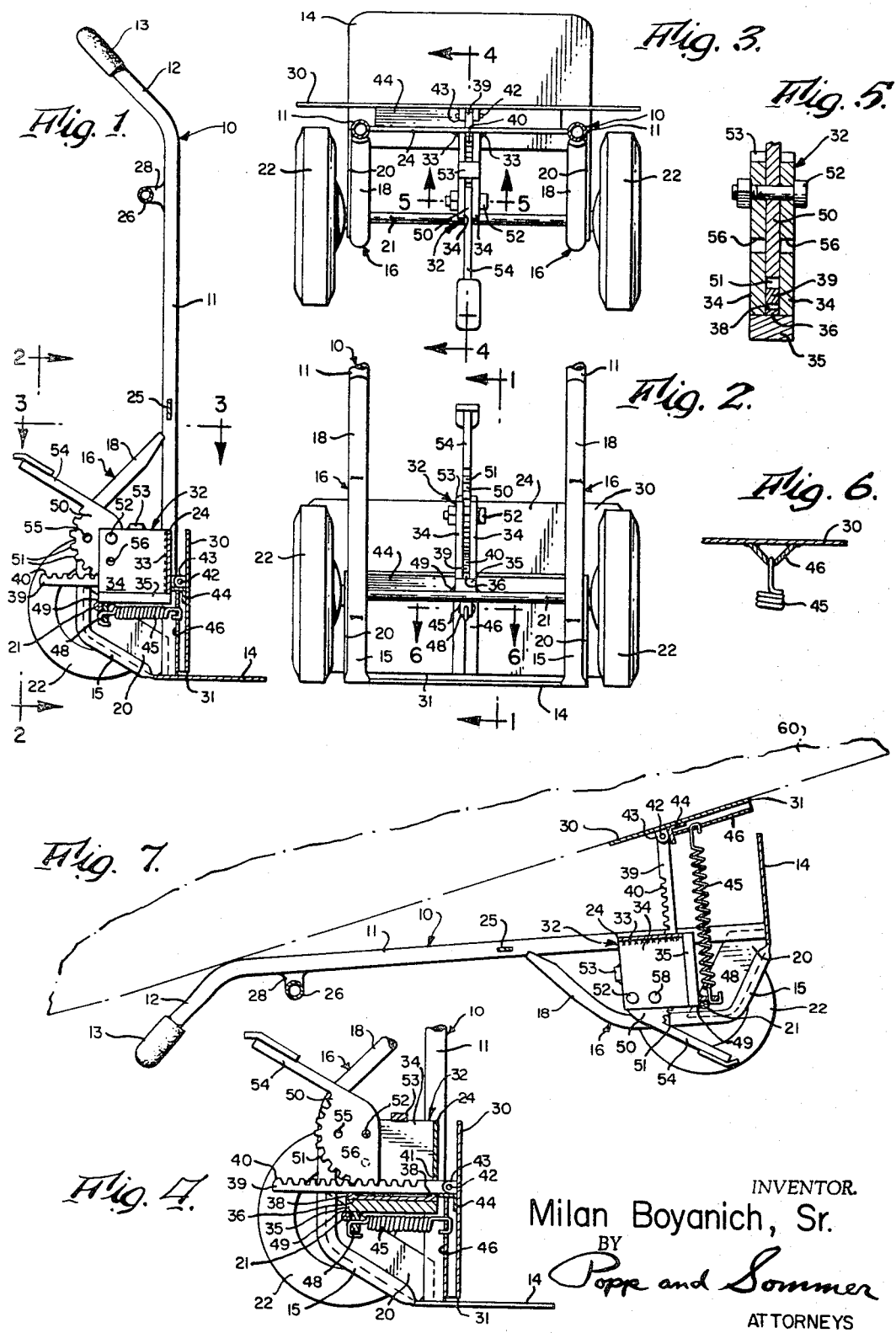

3,419,281
HAND TRUCK WITH PUSH PLATE
Milan Boyanich, Sr., 41 Fontaine Drive,
Cheektowaga, N.Y. 14225
Filed Nov. 6, 1967, Ser. No. 680,728
9 Claims. (Cl. 280—47.29)

ABSTRACT OF THE DISCLOSURE

The hand truck is of the type having a handled upright frame with rear wheels, a forwardly projecting horizontal bottom load carrying tongue and an upright push plate above and normally at the back of the tongue for disengaging the tongue from under a package being deposited. The improvement is in the simplified mechansim for actuating the push plate as being a casing attached to the rear of the frame and preferably also to the axle, supporting, preferably by a bottom wear plate, a fore-and-aft rack pivoted to the rear of the push plate and the casing also supporting a gear segment journalled in the casing side walls, meshing with the rack and actuated by an arm. A helical return spring connects the back of the push plate with the back of the casing and maintains engagement of a stop between the front of the rack and the back of the push plate and which stops downward movement of the bottom of the push plate when the latter becomes vertical.

---

In the accompanying drawings, FIG. 1 is a vertical fore-and-aft section taken generally on line 1—1, FIG. 2. FIG. 2 is a framentary rear elevational view taken generally on line 2—2, FIG. 1. FIG. 3 is a horizontal section taken generally on line 3—3, FIG. 1. FIG. 4 is a fragmentary somewhat enlarged vertical fore-and-aft section taken on line 4—4, FIG. 3. FIG. 5 is an enlarged transverse section taken on line 5—5, FIG. 3. FIG 6 is an enlarged transverse section taken on line 6—6, FIG. 2. FIG. 7 is a view similar to FIG. 1 showing the hand truck in a prone position to support a very large package with the push plate of the hand truck locked in a projected position to support a broad area of the bottom side of the package to avoid indentation and damage thereof.

The hand truck is normally used in the upright condition as illustrated in FIGS. 1–6 and comprises an upright frame 10 having upright tubular side bars 11, the upper ends 12 of which are bent rearwardly to provide handles having grips 13. The lower edge of the two side bars 11 are butt welded to the top of a horizontal plate 14 which projects forwardly from these bars to provide a bottom load carrying tongue. To the rear edge of this tongue, adjacent each tubular side bar 11, is welded the lower end of the leg 15 of a U-shaped tubular bar 16, the upper leg 18 of which is welded to the rear of a companion vertical tubular side frame bar 11 a substantial distance above the tongue 14.

To the outside of the bottom of each U-shaped frame bar 16 is welded a vertical fore-and-aft plate 20, these plates also being welded to the bottoms of the tubular upright side bars 11. A horizontal axle 21 extends through and is suitably secured to these fore-and-aft side plates 20 and projects outwardly therefrom and is supported by a pair of rubber tired wheels 22 which are thereby arranged in rear of the truck frame.

The truck frame also has a broad vertical cross plate 24 arranged a short distance above the tongue 14 and secured at its opposite ends to the opposing sides of the two tubular vertical frame bars 11, as best shown in FIG. 3. Another cross bar 25 is similarly secured between the frame bars 11 at a higher elevation, and a cross handle bar 26 is secured between a pair of brackets 28 projecting rearwardly from the upper parts of the side bars 11 of the truck frame.

The present invention is essentially directed to the mechanism for projecting and retracting the upright push plate 30 horizontally fore-and-aft, this push plate being arranged generally parallel with the axis of the wheels 22 with its lower edge 31 in closely spaced relation to the top face of the load carrying tongue 14. This push plate 30 preferably extends sideways to an extent to be in front of the wheels 22, as best shown in FIG. 3, and the mechanism for projecting the push plate 30 is essentially carried by a casing indicated generally at 32. While this casing can be removably secured to the truck frame 10, so as to permit a push plate, together with the actuating mechanism of the present invention to be sold as an accessory for existing hand trucks, it is shown as being welded to the center of the vertical frame cross plate 24 as indicated at 33. Thus, this casing is shown as having closely spaced vertical fore-and-aft side walls or plates 34 welded as at 33 to the rear of the frame cross plate 24 and as having a bottom plate 35 suitably secured thereto.

Between the two side plates 34 the bottom plate 35 carries a wear plate 36, preferably made of bearing metal, this wear plate having upwardly projecting cross ridges 38 at its front and rear ends as best shown in FIG. 4.

These ridges slidingly support the bottom of a horizontal rack 39, the teeth 40 of which project upwardly. The front end of this rack projects through a hole 41 in the vertical frame cross plate 24 and is pivotally secured by a pivot pin 42 to a bracket 43 projecting rearwardly from the rear of the push plate 30. This pivot pin 42 is horizontal and arranged transversely of the line of movement of the push plate 30 and rack 39, and below this pivot pin 42 a stop 44, which is L-shaped in cross section, is welded or suitably secured to the back of the push plate 30 in position to engage the bottom of the rack 39.

This L-shaped stop can swing out of engagement with the bottom of the rack 39, as illustrated in FIG. 7, but is normally held in engagement with the rack by a helical tension return spring 45. This helical tension spring is arranged below the casing 32 and has its forward end suitably secured to the center of a V-shaped vertical bar 46 welded to and forming a vertical ridge along the rear side of the push plate 30, as best shown in FIGS. 1, 4 and 6. The rear end of this helical tension spring is anchored in a bracket 48 projecting downwardly from the rear part of the casing 32 immediately in front of the axle 21. To strengthen the mounting for this casing 32, and the truck frame 10 and its axle, this casing is preferably welded, as indicated at 49, to the axle 21.

The mechanism is completed by a gear segment 50 journalled between the side plates 34 of the casing 32 and with its teeth 51 meshing with the teeth 40 of the rack. This gear segment 50 is journalled on a cross pin 52 across the casing 32 and its operative movement is limited by a stop in the form of the cross piece 53 welded to the top of the casing 32. The gear segment 50 is actuated by an integral foot treadle 54.

For the special service illustrated in FIG. 7, the gear segment is provided with a cross hole 55 which comes into register with a pair of cross holes 56 in the side plates 34 of the casing 32 when the treadle 54 is in its fully depressed position. In this position, these registering holes 55, 56 are adapted to receive a locking pin 58, FIG. 7.

In the normal operation of the hand truck in its upright position, the tongue 14 is pushed under, say, a stack of boxes (not shown) and the handles 13 and stack of boxes tilted backwardly, so that in transporting the stack of boxes on the rubber tired wheels 22 the stack of boxes is essentially supported by the bottom tongue 14, but also by the vertical tubular side bars 11 of the truck frame 10. The stack of boxes is then placed against, say, the wall of the transport truck, and to retrieve the hand truck without disturbing this wall engagement of the stack of boxes, the operator simply pushes downwardly on the treadle 54. Through the gear segment 50 and rack 39, this pushes the vertical transverse push plate 30 forwardly thereby to push against the stack of boxes so placed, and pull the tongue 14 out from under the stack without disturbing its postion.

When withdrawn the operator releases the foot treadle and the return spring 45 pulls the push plate 30 back to its normal inoperative position illustrated in FIGS. 1–6, this also moving the rack 39 rearwardly along the cross ridges 38 of the wear plate 36 and rotating the gear segment 50 so as to return the treadle 54 to its elevated inoperative position. During this movement, the push plate 30 is held upright by virtue of the L-shaped stop 44 between it and the bottom of the rack 39, this L-shaped stop being held operative by the helical tension spring 45.

If, however, a very large box 60, FIG. 7, is to be transported, the treadle 54 can be fully depressed by the foot of the operator so that the hole 55 in the gear segment 50 comes into register with the pair of holes 56 through the side walls 34 of the casing 32. The operator can then slip the pin 58 through these registering holes so that the push plate is fixed in its fully projected position, illustrated in FIG. 7. In this position the hand truck frame 10 can be placed in a prone position with its handles or grips on the ground and the very large carton 60 loaded thereon. In this position one end of the very large carton rests with its flat side on the flat face of the push plate 30 which is free to adapt itself so as to lay flat against the underside of the case or carton as illustrated in FIG. 7. Thus the stop 44 is free to leave the bottom of the rack 39 for this purpose. Without this feature of the present invention the corresponding end of the large carton 60 would be supported on the forward end of the load carrying tongue 14 and during transit would be in danger of having this tongue indent the wall of the carton 60, which is its bottom wall during such transit, with danger of injury to the contents.

From the foregoing it will be seen that the casing 32, detachable or permanently fixed to the truck frame 10, together with the contained rack and gear segment, and also providing attachment for the helical return spring 45 provides a very simple, inexpensive and long-lived mechanism for projecting and retracting the push plate 30 at will and with little effort. It will also be seen that by securing the casing 32 to the axle 21, the frame and axle are both considerably strengthened and the casing 32 reliably held in place, particularly to insure proper operation of the contained mechanism. Further, by virtue of the stop 44 the hand truck can be put to the unusual service illustrated in FIG. 7 without danger of indenting a very large carton 60, carried by the truck while in this position.

I claim:

1. A hand truck having a vertically elongated frame (10), with a hand grip portion (13) at its upper end and journalled at its lower end on supporting wheels (22) rotatable about a transverse first axis arranged in rear of said frame (10), a load receiving generally horizontal tongue (14) fixed to project forwardly from the bottom of the frame (10) to be worked under articles to be transported, and an upright push plate (30) arranged generally parallel with said first axis with its bottom (31) adjacent the top surface of said tongue (14); wherein the invention comprises a casing (32) fixed to said frame (10) in back of said push plate (30) and having a bottom wall (35) and spaced opposite fore-and-aft side walls (34) rising from the sides of said bottom wall (35) a generally horizontal rack (39) slidingly mounted (36) on said bottom wall (35) to move generally parallel with said side walls (34), means (42, 43) pivotally connecting the front end of said rack (39) with the back of said push plate (30), a gear (50) journalled in said casing (32) on a second axis generally parallel with said first axis and with its teeth (51) engaging the teeth (40) of said rack (39), a lever arm (54) movable by the operator to oscillate said gear (50) in the direction to project said rack (39) and push plate (30) forwardly over the top of said tongue (14), and means (45) biasing said push plate (30) to a position over the rear of said tongue (14).

2. A hand truck as set forth in claim 1 wherein said wheels (22) are journalled on an axle (21) extending crosswise of said frame (10) concentric with said first axis, and wherein the rear of said casing (32) is fixed (49) to said axle (21).

3. A hand truck as set forth in claim 1 wherein said biasing means (45) comprises a generally horizontal helical tension spring secured (46) at its front end to the rear of said push plate (30) and at its rear to the rear of said casing (32).

4. A hand truck as set forth in claim 3 wherein said helical tension spring (45) is arranged under said casing (32).

5. A hand truck as set forth in claim 1 wherein a stop (44) is interposed between the rear of said push plate (30) and said front end of said rack (39) in position to stop downward swinging and movement of the bottom (31) of the push plate (30) when the push plate reaches an upright position, said spring (45) biasing said push plate (30) in a direction to render said stop (44) operative.

6. A hand truck as set forth in claim 5 additionally including means (55, 56, 58) for locking said gear (50) when said push plate (30) is in a forwardly projected position.

7. A hand truck as set forth in claim 1 additionally including means (55, 56, 58) for locking said gear (50) when said push plate (30) is in a forwardly projected position.

8. A hand truck as set forth in claim 7 wherein said locking means comprises a pin (58) inserted through registering holes (55, 56) in the gear (50) and at least one side wall (34) of said casing.

9. A hand truck as set forth in claim 1 wherein a wear plate (36) is interposed between the bottom of said rack (39) and said bottom wall (35) of said casing (32) and wherein the teeth (40) of the rack (39) project upwardly to engage radially projecting teeth (51) of said gear (50).

References Cited

UNITED STATES PATENTS

| 1,921,661 | 8/1933 | Conner | 280—47.29 |
| 2,949,314 | 8/1960 | Strohmaier | 280—47.28 |
| 3,052,323 | 9/1962 | Hopfeld | 280—47.29 |

BENJAMIN HERSH, *Primary Examiner.*

L. DANIEL MORRIS, Jr., *Assistant Examiner.*